Figure 2:
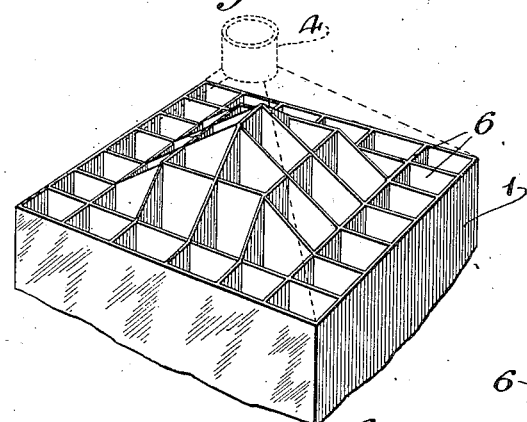

July 12, 1932. R. BENNETT ET AL 1,867,489
MEANS FOR STORING AND SUPPLYING GLASS BATCHES OF UNIFORM MIXTURE
Filed April 16, 1928

Inventors
Robert Bennett,
and Samuel B. Bowman,
By
Eccleston + Eccleston
Attorneys Patented July 12, 1932

1,867,489

UNITED STATES PATENT OFFICE

ROBERT BENNETT AND SAMUEL B. BOWMAN, OF ZANESVILLE, OHIO, ASSIGNORS TO HAZEL-ATLAS GLASS CO., OF WHEELING, WEST VIRGINIA, A CORPORATION OF WEST VIRGINIA

MEANS FOR STORING AND SUPPLYING GLASS BATCHES OF UNIFORM MIXTURE

Application filed April 16, 1928. Serial No. 270,438.

It is the general practice, in the glass industry, to provide a batch bin adjacent each melting tank; the batch, consisting of sand, soda, lime, etc., being thoroughly mixed at some central point and then supplied to these individual bins, from which bins the batch is withdrawn and fed to the melting tanks, as desired.

It is well known, that during a single day, with a batch that is mixed with greatest care, various grades of glass will be produced, without any visible change in the tank conditions, as regards either the feeding or melting of the batch. The seriousness of this situation is illustrated by the fact that in a single day the grade of glass produced will vary so greatly, that during one period of the day the selectors would be able to pack 95% of the ware produced, while during another period of the day the quality of the ware would warrant packing only 75%; and in some periods not over 25% of the ware could be packed; and all the ware being made from the same batch and from the same batch bin.

Needless to say, this production of good, bad and indifferent qualities of glass from the same batch, and without any apparent change in the tank conditions, has been the subject of much study and investigation. Of course, many factors are involved, and many suggestions have been offered as a cure for this most unsatisfactory condition. It is needless to consider such suggestions here, as they are known to those skilled in the glass making art; it being sufficient to state that while conditions have often been improved by concentrating on one or another particular factor involved, yet the result has only been temporary, and the same problem soon has to be again faced.

We have discovered that the real cause of this baffling condition, is not due to any one of the numerous causes to which the condition has heretofore been attributed, but is due to the fact that the materials which go to make up the batch have become more or less segregated in the period between the mixing of the batch and the feeding of it to the melting tank. This segregation may occur at various stages between the mixing and the feeding of the batch. The receptacles now in common use for receiving the mixed batch preparatory to being fed to the melting tanks, are merely ordinary square or round bins, into which the batch is introduced at the top and dispensed at the bottom. When the batch which, of course, has been thoroughly mixed according to a formula, is introduced at the top of the bin, it will commence to pile up on the floor thereof in a cone-like formation; and obviously there is a tendency for the heavier and lighter particles to become segregated by reason of the heavier and coarser particles gravitating down the sides of this cone-like mass. Thus the batch is not of the same uniform consistency after it has been supplied to the bin. But the more serious segregation occurs in the dispensing of the batch. It will be understood that when the batch flows from the opening at the bottom of these conventional bins, a vortex will be formed above the opening, which vortex will gradually extend to the upper region of the bin; the condition being well illustrated by the action of sand in an hour glass. The heavier or coarser particles will gravitate more readily down the sides of the this vortex, thus leaving the lighter or finer particles to follow later, thereby causing a most serious segregation of the batch. Further segregation, but of a less serious nature, also sometimes occurs between the withdrawal of the batch from the bin and the feeding of it to the melting tank.

From the foregoing remarks, it will be apparent that the object of the present invention is to provide an apparatus for preventing any segregation of the batch while it is being supplied to a bin or like receptacle, while it is in the bin, and while it is being withdrawn from the bin, and while it is being fed to the melting tank. In other words, the object of the present invention is to provide a method and means whereby the batch will be introduced into the melting tank in the same uniform consistency as when it was originally mixed.

It will be apparent that the specific apparatus shown and described herein is subject to wide variations; and accordingly the specific apparatus is to be considered in an illustrative rather than a limiting sense.

Figure 1:
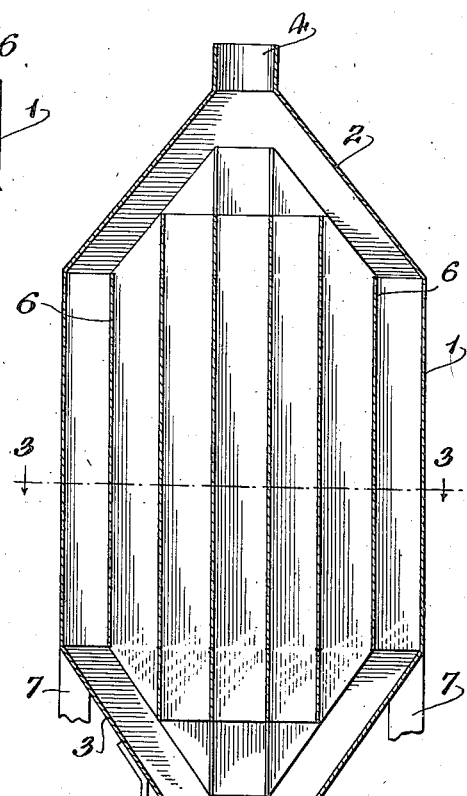

In the following detailed description, reference is to be had to the accompanying drawing; in which Figure 1 is a vertical sectional view of the improved bin, feeding mechanism, and a portion of a melting tank; parts of the construction being shown in elevation.

Figure 3:
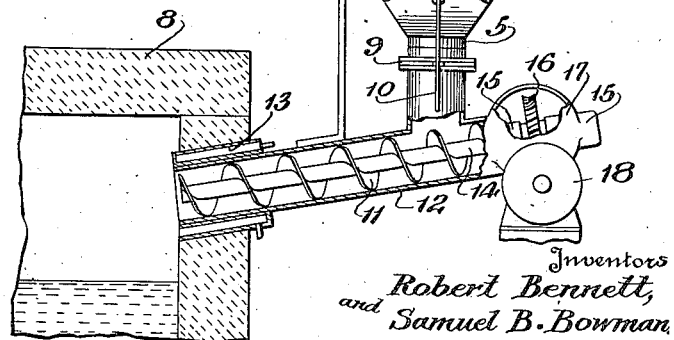

Figure 2 is a perspective view of the upper portion of the improved construction; the casing thereof being shown in outline; and Figure 3 is a horizontal sectional view taken on line 3—3 of Figure 1.

Referring to the drawing more in detail, the batch bin comprises the receptacle 1 which is depicted herein as rectangular in cross section but which may of course, be of circular or other desired shape. The receptacle is preferably, though not necessarily, provided with the tapered upper and lower ends 2 and 3 which terminate in filling and discharge openings 4 and 5 respectively.

For the purpose of preventing segregation of the materials of the batch while entering the bin, while being stored therein, and while being discharged therefrom, we have mounted on the interior of the receptacle 1 a plurality of vertically disposed partitions 6 which provide a cellular interior as clearly indicated in Figure 2. These partitions are shown as of varying lengths so as to conform to the shape of the tapered ends of the receptacle and also to extend to a point close to the entrance and discharge openings 4 and 5. By extending the partitions as indicated they provide a more definite control on the mixed batch since they influence its movement immediately upon entry into the receptacle and retain this control until the batch passes through the discharge opening 5. It should be understood however, that this extension of the partitions beyond the main body of the receptacle is not essential to the practical operation of the invention.

In the specific form illustrated the batch bin is suitably supported upon standards 7 or the like, at a higher level than the glass furnace 8, preferably with the discharge end 5 slightly above the point where the batch is to enter the furnace; but of course, the general arrangement may vary in different installations. Associated with the discharge opening 5 is a sluice gate 9 which may be operated by a lever 10. This gate will be set at the required opening to provide the flow therethrough of the desired quantity of batch; the opening of the gate being adjusted when necessary to regulate the flow.

Arranged beneath the outlet, to receive the glass batch, is a screw conveyer 11 mounted in a suitable casing 12. The screw conveyer and casing project through a suitable opening in the melting tank, and the casing is preferably protected by a water cooled bosh 13 which is mounted in the opening and encircles the casing. It is to be noted that the use of this screw conveyer aids in maintaining the uniformity of the mixture while it is being transported to the melting tank for a conveyer of this type will cause the heavier or coarser particles to travel at the same speed as the lighter or finer particles.

The conveyer shaft 14 is mounted in bearings 15, 15, and keyed to this shaft is a worm wheel 16; the bearings, worm wheel, etc., being protected from dust by the casing 17. Meshing with the worm wheel 16 is a worm (not shown) which is driven by a motor 18. It will be understood, of course, that any desired means may be substituted for the specific operating means shown herein.

In the operation of the bin as described, the batch having been carefully prepared and mixed according to formula, is fed into the receptacle through the filling opening 4. Instead of piling up on the floor of the receptacle in the form of a cone and thereby partly segregating the ingredients, the material will enter the several central compartments and when these are filled with the uniform mixture the remainder will overflow into the outer compartments until all are filled. It will be apparent therefore that up to this point the uniformity of the mixture has been maintained and will be maintained in the stored material.

When the gate 9 is opened to permit the feeding of the batch to the furnace 8, the portion within the central compartment will first discharge, the batch gravitating by a compact sliding movement throughout its length and preserving the characteristics of its original mixed condition. The adjacent compartments will in turn take up the feeding operation and direct their contents into the tapered lower end 3 of the bin where the several streams will combine in passing through the discharge outlet 5. It will thus be apparent that any possibility of the formation of a vortex in the discharge end of the bin is entirely eliminated thereby avoiding the attendant objectionable feature of partly segregating the constituents of the batch in this step of the process of feeding the material. Furthermore, the screw conveyer 11 in transporting the batch to the furnace will maintain this uniform consistency by reason of its action on the batch in preventing a free gravitational movement thereof. It will be understood that in accordance with this invention the batch is preferably fed continuously to the melting tank, as this eliminates the possibility of unequal or irregular feeding; but, of course, the invention is in no manner limited to continuous feed.

From the foregoing description it will be apparent that we have devised a very simple and efficient apparatus whereby the batch will be introduced into the melting tank in the same uniform consistency as when it was originally mixed. And we have found in actual practice that a uniform quality of glass is continuously produced, without any showing of hard and soft glass, or other defects incidental to the former practice, in which the various constituents of the batch were not of uniform consistency when fed to the melting tank.

What we claim is:

1. A bin for glass batches, including a vertically disposed receptacle having a tapered lower end, and a plurality of vertical partitions in said receptacle, said partitions being of varying lengths to substantially conform to said tapered lower end, for the purpose described.

2. A batch bin for glass batches, including a vertically disposed receptacle having a tapered upper end, and a plurality of vertical partitions in said receptacle, said partitions being of varying lengths to substantially conform to said tapered upper end, for the purpose described.

3. A batch bin for glass batches, including a vertically disposed receptacle having tapered upper and lower ends, a plurality of vertical partitions in said receptacle, the partitions being of varying lengths to conform to the tapered upper and lower ends, a screw conveyer associated with the lower end of the receptacle and leading to a glass melting tank, means for continuously rotating said screw conveyer, and a gate for regulating the flow of the batch from the receptacle to the conveyer.

ROBERT BENNETT.
SAMUEL B. BOWMAN.